(12) United States Patent
Kaplan-Bie et al.

(10) Patent No.: US 11,359,074 B2
(45) Date of Patent: Jun. 14, 2022

(54) SOLUTION BASED POST-PROCESSING METHODS FOR MYCOLOGICAL BIOPOLYMER MATERIAL AND MYCOLOGICAL PRODUCT MADE THEREBY

(71) Applicant: Ecovative Design LLC, Green Island, NY (US)

(72) Inventors: Jessica Kaplan-Bie, Troy, NY (US); Gavin R. McIntyre, Troy, NY (US); Lucy Greetham, South Burlington, VT (US); Ian Bonesteel, Wynantskill, NY (US); Alex Carlton, Troy, NY (US); Eben Bayer, Troy, NY (US)

(73) Assignee: ECOVATIVE DESIGN LLC, Green Island, NY (US)

( * ) Notice: Subject to any disclaimer, the term of this patent is extended or adjusted under 35 U.S.C. 154(b) by 136 days.

(21) Appl. No.: 15/940,514

(22) Filed: Mar. 29, 2018

(65) Prior Publication Data

US 2018/0282529 A1 Oct. 4, 2018

Related U.S. Application Data

(60) Provisional application No. 62/479,521, filed on Mar. 31, 2017.

(51) Int. Cl.
| | | |
|---|---|---|
| *C08L 5/08* | (2006.01) | |
| *B29C 43/32* | (2006.01) | |
| *C08K 3/16* | (2006.01) | |
| *C08K 5/05* | (2006.01) | |
| *C08L 97/00* | (2006.01) | |
| *B29C 43/34* | (2006.01) | |

(52) U.S. Cl.
CPC ............... *C08L 5/08* (2013.01); *B29C 43/32* (2013.01); *C08K 3/16* (2013.01); *C08K 5/05* (2013.01); *C08L 97/005* (2013.01); *B29C 2043/3422* (2013.01); *C08K 2003/162* (2013.01); *C08L 2201/06* (2013.01)

(58) Field of Classification Search
CPC .......... C12N 1/14; A01N 63/30; A01N 25/12; A23G 3/52; A61K 2300/00; A61K 36/06; C12R 1/645; C12P 2203/00; C12P 1/02; C11B 1/10; C07K 14/37; C07K 4/06; C07K 14/435; C07K 14/47; Y10T 428/1348; A01G 18/00; C08K 5/05; C08K 3/16; C12Q 1/025; C08L 5/08; C08L 97/005; C08L 2201/06; C08L 99/00; B29C 43/32
See application file for complete search history.

(56) References Cited

U.S. PATENT DOCUMENTS

| | | |
|---|---|---|
| 1,979,176 A | 10/1934 | Schicht |
| 2,509,984 A | 5/1950 | Morrow |
| 2,657,647 A | 11/1953 | Rapisarda |
| 2,723,493 A | 11/1955 | Stoller |
| 2,815,621 A | 12/1957 | Carter |
| 2,964,070 A | 12/1960 | Linhardt |
| 3,268,606 A | 8/1966 | Jaeger |
| 3,316,592 A | 5/1967 | Forrest |
| 3,317,375 A | 5/1967 | Molinet et al. |
| 3,421,554 A | 1/1969 | Carter |
| 3,477,558 A | 11/1969 | Fleischauer |
| 3,499,261 A | 3/1970 | Hullhorst et al. |
| 3,708,952 A | 1/1973 | Schulze et al. |
| 3,717,953 A | 2/1973 | Kuhn et al. |
| 3,782,033 A | 1/1974 | Hickerson |
| 3,810,327 A | 5/1974 | Giansante |
| 3,828,470 A | 8/1974 | Stoller |
| 3,961,938 A | 6/1976 | Iizuka et al. |
| 4,027,427 A | 6/1977 | Stoller et al. |
| 4,036,122 A | 7/1977 | Langen |
| 4,038,807 A | 8/1977 | Beardsley et al. |
| 4,063,383 A | 12/1977 | Green |
| 4,073,956 A | 2/1978 | Yates |
| 4,127,965 A | 12/1978 | Mee |
| 4,136,767 A | 1/1979 | Sarovich |
| 4,226,330 A | 10/1980 | Butler |
| 4,263,744 A | 4/1981 | Stoller |
| 4,265,915 A | 5/1981 | MacLennan et al. |
| 4,294,929 A | 10/1981 | Solomons et al. |
| 4,337,594 A | 7/1982 | Hanacek et al. |
| 4,370,159 A | 1/1983 | Holtz |
| 4,568,520 A | 2/1986 | Ackermann et al. |

(Continued)

FOREIGN PATENT DOCUMENTS

| | | |
|---|---|---|
| CN | 1059662 A | 3/1992 |
| CN | 1732887 A | 2/2006 |

(Continued)

OTHER PUBLICATIONS

Haneef et al., "Advanced Materials from Fungal Mycelium: Fabrication and Tuning of Physical Properties", Scientific Reports 7:41292 DOI: 10.1038/srep41292, Jan. 24, 2017.

(Continued)

*Primary Examiner* — Lynn Y Fan
(74) *Attorney, Agent, or Firm* — Knobbe Martens Olson & Bear, LLP

(57) ABSTRACT

A mycological biopolymer material is subjected to treatment in one or more solutions that work to enhance and/or retain the inherent material properties of the material. In one embodiment, the solution is an organic solution; in another embodiment, the solution is an organic solvent with a salt; in another embodiment, the solution is an organic solvent phenol and/or polyphenol; and in another embodiment, a series of such solutions is used.

21 Claims, 3 Drawing Sheets

(56) References Cited

U.S. PATENT DOCUMENTS

| | | |
|---|---|---|
| 4,620,826 A | 11/1986 | Rubio et al. |
| 4,716,712 A | 1/1988 | Gill |
| 4,722,159 A | 2/1988 | Watanabe et al. |
| 4,878,312 A | 11/1989 | Shimizu |
| 4,922,650 A | 5/1990 | Akao et al. |
| 4,960,413 A | 10/1990 | Sagar et al. |
| 5,021,350 A | 6/1991 | Jung et al. |
| 5,030,425 A | 7/1991 | Bowers-Irons et al. |
| 5,074,959 A | 12/1991 | Yamanaka et al. |
| 5,085,998 A | 2/1992 | Lebron et al. |
| 5,088,860 A | 2/1992 | Stockdale et al. |
| 5,123,203 A | 6/1992 | Hiromoto |
| 5,230,430 A | 7/1993 | Kidder |
| 5,306,550 A | 4/1994 | Nishiyama et al. |
| 5,335,770 A | 8/1994 | Baker et al. |
| 5,370,714 A | 12/1994 | Ogawa |
| 5,433,061 A | 7/1995 | Hutchinson et al. |
| 5,440,860 A | 8/1995 | Meli et al. |
| 5,475,479 A | 12/1995 | Hatakeyama et al. |
| 5,498,384 A | 3/1996 | Volk et al. |
| 5,503,647 A | 4/1996 | Dahlberg et al. |
| 5,511,358 A | 4/1996 | Morita et al. |
| 5,532,217 A | 7/1996 | Silver et al. |
| 5,569,426 A | 10/1996 | Le Blanc |
| 5,589,390 A | 12/1996 | Higuchi et al. |
| 5,590,489 A | 1/1997 | Hattori et al. |
| 5,598,876 A | 2/1997 | Zanini et al. |
| 5,606,836 A | 3/1997 | Insalaco et al. |
| 5,647,180 A | 7/1997 | Billings et al. |
| 5,681,738 A | 10/1997 | Beelman et al. |
| 5,682,929 A | 11/1997 | Maginot et al. |
| 5,685,124 A | 11/1997 | Jandl |
| 5,711,353 A | 1/1998 | Ichikawa et al. |
| 5,802,763 A | 9/1998 | Milstein |
| 5,854,056 A | 12/1998 | Dschida |
| 5,888,803 A | 3/1999 | Starkey |
| 5,897,887 A | 4/1999 | Haeberli |
| 5,919,507 A | 6/1999 | Beelman et al. |
| 5,944,928 A | 8/1999 | Seidner |
| 5,948,674 A | 9/1999 | Mankiewicz |
| 5,979,109 A | 11/1999 | Sartor et al. |
| 6,041,544 A | 3/2000 | Kananen et al. |
| 6,041,835 A | 3/2000 | Price |
| 6,098,677 A | 8/2000 | Wegman et al. |
| 6,112,504 A | 9/2000 | McGregor et al. |
| 6,197,573 B1 | 3/2001 | Suryanarayan et al. |
| 6,226,962 B1 | 5/2001 | Eason et al. |
| 6,300,315 B1 | 10/2001 | Liu |
| 6,306,921 B1 | 10/2001 | Al Ghatta et al. |
| 6,329,185 B1 | 12/2001 | Kofod et al. |
| 6,349,988 B1 | 2/2002 | Foster et al. |
| 6,402,953 B1 | 6/2002 | Gorovoj et al. |
| 6,425,714 B1 | 7/2002 | Waddell |
| 6,444,437 B1 | 9/2002 | Sporleder et al. |
| 6,471,993 B1 | 10/2002 | Shastri et al. |
| 6,475,811 B1 | 11/2002 | Babcock |
| 6,482,942 B1 | 11/2002 | Vittori |
| 6,491,480 B2 | 12/2002 | Waddell |
| 6,500,476 B1 | 12/2002 | Martin et al. |
| 6,523,721 B1 | 2/2003 | Nomoto et al. |
| 6,603,054 B2 | 8/2003 | Chen et al. |
| 6,620,614 B1 | 9/2003 | Lüth et al. |
| 6,660,164 B1 | 12/2003 | Stover |
| 6,679,301 B2 | 1/2004 | Makino et al. |
| 6,726,911 B1 | 4/2004 | Jülich et al. |
| 7,043,874 B2 | 5/2006 | Wasser et al. |
| 7,073,306 B1 | 7/2006 | Hagaman |
| 7,122,176 B2 | 10/2006 | Stamets |
| 7,179,356 B2 | 2/2007 | Aksay et al. |
| 7,395,643 B2 | 7/2008 | Franchini et al. |
| 7,514,248 B2 | 4/2009 | Gower et al. |
| 7,573,031 B2 | 8/2009 | Behar et al. |
| 7,621,300 B2 | 11/2009 | Bonney et al. |
| 7,661,248 B2 | 2/2010 | Conti et al. |
| 7,754,653 B2 | 7/2010 | Hintz |
| 7,836,921 B2 | 11/2010 | Isomura et al. |
| 8,001,719 B2 | 8/2011 | Bayer et al. |
| 8,205,646 B2 | 6/2012 | Isomura et al. |
| 8,227,224 B2 | 7/2012 | Kalisz et al. |
| 8,227,233 B2 | 7/2012 | Kalisz et al. |
| 8,241,415 B2 | 8/2012 | Wantling et al. |
| 8,298,810 B2 | 10/2012 | Rocco et al. |
| 8,313,939 B2 | 11/2012 | Kalisz et al. |
| 8,517,064 B2 | 8/2013 | Isomura et al. |
| 8,658,407 B2 | 2/2014 | Lyons et al. |
| 8,763,653 B2 | 7/2014 | Weigel et al. |
| 8,999,687 B2 | 4/2015 | Bayer et al. |
| 9,079,978 B2 | 7/2015 | Räsänen et al. |
| 9,085,763 B2 | 7/2015 | Winiski et al. |
| 9,253,889 B2 | 2/2016 | Bayer et al. |
| 9,332,779 B2 | 5/2016 | Marga |
| 9,394,512 B2 | 7/2016 | Bayer et al. |
| 9,469,838 B2 | 10/2016 | Schaak et al. |
| 9,485,917 B2 | 11/2016 | Bayer et al. |
| 9,555,395 B2 | 1/2017 | Araldi et al. |
| 9,714,180 B2 | 7/2017 | McIntyre et al. |
| 9,752,122 B2 | 9/2017 | Marga |
| 9,795,088 B2 | 10/2017 | Bayer et al. |
| 9,801,345 B2 | 10/2017 | Bayer et al. |
| 9,803,171 B2 | 10/2017 | Bayer et al. |
| 9,879,219 B2 | 1/2018 | McIntyre et al. |
| 9,914,906 B2 | 3/2018 | Winiski et al. |
| 10,125,347 B2 | 11/2018 | Winiski |
| 10,144,149 B2 | 12/2018 | Araldi et al. |
| 10,154,627 B2 | 12/2018 | McIntyre et al. |
| 10,172,301 B2 | 1/2019 | McNamara et al. |
| 10,266,695 B2 | 4/2019 | Lucht et al. |
| 10,407,675 B2 | 9/2019 | Bayer et al. |
| 10,525,662 B2 | 1/2020 | Bayer et al. |
| 10,537,070 B2 | 1/2020 | Betts et al. |
| 10,583,626 B2 | 3/2020 | Bayer et al. |
| 10,589,489 B2 | 3/2020 | Bayer et al. |
| 10,687,482 B2 | 6/2020 | Ross et al. |
| 10,785,925 B2 | 9/2020 | McNamara et al. |
| 2001/0012235 A1 | 8/2001 | Schuchardt |
| 2002/0110427 A1 | 8/2002 | Waddell |
| 2002/0131828 A1 | 9/2002 | Waddell |
| 2002/0131933 A1 | 9/2002 | Delmotte |
| 2003/0017565 A1 | 1/2003 | Echigo et al. |
| 2003/0056451 A1 | 3/2003 | Pisek et al. |
| 2003/0121201 A1 | 7/2003 | Dahlberg et al. |
| 2003/0232895 A1 | 12/2003 | Omidian et al. |
| 2004/0000090 A1 | 1/2004 | Miller |
| 2004/0020553 A1 | 2/2004 | Amano |
| 2004/0166576 A1 | 8/2004 | Sadaie |
| 2004/0177585 A1 | 9/2004 | Vermette |
| 2005/0133536 A1 | 6/2005 | Kelsey et al. |
| 2005/0137272 A1 | 6/2005 | Gaserod et al. |
| 2006/0134265 A1 | 6/2006 | Beukes |
| 2006/0280753 A1 | 12/2006 | McNeary |
| 2007/0079944 A1 | 4/2007 | Amidon et al. |
| 2007/0196509 A1 | 8/2007 | Riman et al. |
| 2007/0225328 A1 | 9/2007 | Fritz et al. |
| 2007/0227063 A1 | 10/2007 | Dale et al. |
| 2007/0294939 A1 | 12/2007 | Spear et al. |
| 2008/0017272 A1 | 1/2008 | Isomura et al. |
| 2008/0046277 A1 | 2/2008 | Stamets |
| 2008/0047966 A1 | 2/2008 | Carson |
| 2008/0145577 A1 | 6/2008 | Bayer et al. |
| 2008/0234210 A1 | 9/2008 | Rijn et al. |
| 2008/0295399 A1 | 12/2008 | Kawai et al. |
| 2008/0296295 A1 | 12/2008 | Kords et al. |
| 2009/0107040 A1 | 4/2009 | Vandnhove |
| 2009/0191289 A1 | 7/2009 | Lutz et al. |
| 2009/0241623 A1 | 10/2009 | Matano et al. |
| 2009/0246467 A1 | 10/2009 | Delantar |
| 2009/0272758 A1 | 11/2009 | Karwacki et al. |
| 2009/0307969 A1 | 12/2009 | Bayer et al. |
| 2009/0321975 A1 | 12/2009 | Schlummer |
| 2010/0101190 A1 | 4/2010 | Dillon |
| 2010/0158976 A1 | 6/2010 | O'Brien et al. |
| 2010/0159509 A1 | 6/2010 | Xu et al. |
| 2010/0199601 A1 | 8/2010 | Boldrini et al. |
| 2010/0227931 A1 | 9/2010 | Kuwano et al. |

(56) References Cited

U.S. PATENT DOCUMENTS

| | | |
|---|---|---|
| 2010/0243135 A1 | 9/2010 | Pepper et al. |
| 2010/0326564 A1 | 12/2010 | Isomura et al. |
| 2011/0094154 A1 | 4/2011 | Joaquin |
| 2011/0108158 A1 | 5/2011 | Huwiler et al. |
| 2011/0268980 A1 | 11/2011 | Kalisz et al. |
| 2011/0269209 A1 | 11/2011 | Rocco et al. |
| 2011/0269214 A1 | 11/2011 | Kalisz et al. |
| 2011/0306107 A1 | 12/2011 | Kalisz et al. |
| 2012/0000165 A1 | 1/2012 | Williams |
| 2012/0006446 A1 | 1/2012 | Isomura et al. |
| 2012/0060446 A1 | 3/2012 | Merz |
| 2012/0076895 A1 | 3/2012 | Kirejevas et al. |
| 2012/0115199 A1 | 5/2012 | Li et al. |
| 2012/0132314 A1 | 5/2012 | Weigel et al. |
| 2012/0135504 A1 | 5/2012 | Ross |
| 2012/0225471 A1 | 9/2012 | McIntyre et al. |
| 2012/0227899 A1 | 9/2012 | McIntyre et al. |
| 2012/0231140 A1 | 9/2012 | Hofmann et al. |
| 2012/0270031 A1 | 10/2012 | Guan et al. |
| 2012/0270302 A1 | 10/2012 | Bayer et al. |
| 2012/0315687 A1 | 12/2012 | Bayer et al. |
| 2013/0095560 A1 | 4/2013 | McIntyre et al. |
| 2013/0105036 A1 | 5/2013 | Smith et al. |
| 2013/0210327 A1 | 8/2013 | Corominas |
| 2013/0224840 A1 | 8/2013 | Bayer et al. |
| 2013/0274892 A1 | 10/2013 | Lelkes et al. |
| 2013/0309755 A1 | 11/2013 | McIntyre et al. |
| 2014/0038619 A1 | 2/2014 | Moulsley |
| 2014/0056653 A1 | 2/2014 | Scully et al. |
| 2014/0069004 A1 | 3/2014 | Bayer et al. |
| 2014/0093618 A1 | 4/2014 | Forgacs et al. |
| 2014/0173977 A1 | 6/2014 | Juscius |
| 2014/0186927 A1 | 7/2014 | Winiski et al. |
| 2014/0371352 A1 | 12/2014 | Dantin et al. |
| 2015/0033620 A1 | 2/2015 | Greetham et al. |
| 2015/0038619 A1 | 2/2015 | McIntyre et al. |
| 2015/0101509 A1 | 4/2015 | McIntyre et al. |
| 2015/0197358 A1 | 7/2015 | Larsen |
| 2015/0342138 A1 | 12/2015 | Bayer et al. |
| 2015/0342224 A1 | 12/2015 | Medoff |
| 2016/0002589 A1 | 1/2016 | Winiski |
| 2016/0264926 A1 | 9/2016 | Winiski et al. |
| 2016/0355779 A1 | 12/2016 | Ross |
| 2017/0000040 A1 | 1/2017 | Bayer et al. |
| 2017/0028600 A1 | 2/2017 | McIntyre et al. |
| 2017/0071214 A1 | 3/2017 | Rehage |
| 2017/0218327 A1 | 8/2017 | Amstislavski et al. |
| 2017/0253849 A1 | 9/2017 | Miller et al. |
| 2017/0253852 A1 | 9/2017 | Bayer et al. |
| 2018/0014468 A1 | 1/2018 | Ross et al. |
| 2018/0148682 A1 | 5/2018 | Ross et al. |
| 2018/0282529 A1 | 10/2018 | Kaplan-Bie |
| 2018/0368337 A1 | 12/2018 | McIntyre et al. |
| 2019/0059431 A1 | 2/2019 | Kozubal et al. |
| 2019/0090436 A1 | 3/2019 | Betts et al. |
| 2019/0284307 A1 | 9/2019 | Chase et al. |
| 2019/0322997 A1 | 10/2019 | Schaak |
| 2019/0330668 A1 | 10/2019 | Kozubal et al. |
| 2019/0338240 A1 | 11/2019 | Carlton et al. |
| 2019/0357454 A1 | 11/2019 | Mueller et al. |
| 2019/0359931 A1 | 11/2019 | Mueller et al. |
| 2019/0390156 A1 | 12/2019 | Bayer et al. |
| 2020/0024577 A1 | 1/2020 | Carlton et al. |
| 2020/0025672 A1 | 1/2020 | Scullin et al. |
| 2020/0055274 A1 | 2/2020 | Bayer et al. |
| 2020/0095535 A1 | 3/2020 | Kozubal et al. |
| 2020/0102530 A1 | 4/2020 | Winiski et al. |
| 2020/0146224 A1 | 5/2020 | Kaplan-Bie et al. |
| 2020/0157506 A1 | 5/2020 | Bayer et al. |
| 2020/0208097 A1 | 7/2020 | Winiski |
| 2020/0239830 A1 | 7/2020 | O'Brien et al. |
| 2020/0268031 A1 | 8/2020 | Macur et al. |
| 2020/0270559 A1 | 8/2020 | Macur et al. |
| 2020/0392341 A1 | 12/2020 | Smith et al. |
| 2021/0127601 A9 | 5/2021 | Kaplan-Bie et al. |
| 2021/0348117 A9 | 11/2021 | Winiski |

FOREIGN PATENT DOCUMENTS

| | | |
|---|---|---|
| CN | 101248869 A | 8/2008 |
| CN | 101653081 A | 2/2010 |
| CN | 106947702 A | 7/2017 |
| EP | 0226292 A1 | 6/1987 |
| EP | 1312547 A1 | 5/2003 |
| EP | 2677030 A1 | 12/2013 |
| EP | 2735318 A1 | 5/2014 |
| EP | 2875805 A1 | 5/2015 |
| EP | 2878340 A1 | 6/2015 |
| EP | 2485779 B1 | 2/2018 |
| EP | 3292769 A1 | 3/2018 |
| GB | 142800 A | 1/1921 |
| GB | 1525484 A | 9/1978 |
| GB | 2032456 A | 5/1980 |
| GB | 2165865 A | 4/1986 |
| IN | 358266 B | 7/2020 |
| JP | H03234889 A | 10/1991 |
| JP | H049316 A | 1/1992 |
| JP | 6111510 B1 | 4/2017 |
| KR | 20050001175 A | 1/2005 |
| KR | 101851655 B1 | 4/2018 |
| WO | WO 1999/024555 | 5/1999 |
| WO | WO 2001/087045 | 11/2001 |
| WO | WO 2005/067977 | 7/2005 |
| WO | WO 2008/025122 | 3/2008 |
| WO | WO 2008/073489 | 6/2008 |
| WO | WO2010005476 | 1/2010 |
| WO | WO 2012/122092 | 9/2012 |
| WO | WO 2014/031810 | 2/2014 |
| WO | WO 2014/039938 | 3/2014 |
| WO | WO 2014/195641 | 12/2014 |
| WO | WO 2016/149002 | 9/2016 |
| WO | WO 2016/168563 | 10/2016 |
| WO | WO 2017/056059 | 4/2017 |
| WO | WO 2017/120342 | 7/2017 |
| WO | WO 2017/136950 | 8/2017 |
| WO | WO 2017/151684 | 9/2017 |
| WO | WO 2017/205750 | 11/2017 |
| WO | WO 2018/011805 | 1/2018 |
| WO | WO 2018/014004 | 1/2018 |
| WO | WO 2018/064968 | 4/2018 |
| WO | WO 2018/183735 | 10/2018 |
| WO | WO 2018/189738 | 10/2018 |
| WO | WO 2019/046480 | 3/2019 |
| WO | WO 2019/099474 | 5/2019 |
| WO | WO 2019/217175 | 11/2019 |
| WO | WO 2019/226823 | 11/2019 |
| WO | WO 2019/246636 | 12/2019 |
| WO | WO 2020/023450 | 1/2020 |
| WO | WO 2020/072140 | 4/2020 |
| WO | WO 2020/082044 | 4/2020 |
| WO | WO 2020/106743 | 5/2020 |
| WO | WO 2020/176758 | 9/2020 |
| WO | WO 2020/186068 | 9/2020 |
| WO | WO 2020/186169 | 9/2020 |
| WO | WO 2020/237201 | 11/2020 |

OTHER PUBLICATIONS

Heisig et al., USGS, "Ground-Water Resources of the Clifton Park Area, Saratoga County, New York", 2002, retrieved from the internet (Oct. 15, 2016): http://ny.water.usgs.gov/pubs/wri/wri014104/wrir01-41 04.pdf.

Instuctables, How to Grow Oyster Mushroom Spawn (LowTech), retrieved from the internet Aug. 19, 2018: http://www.instructables.com/id/1-How-to-Grow-Oyster-Mushroom-Spawn-Low-Tech/.

PhpBB Shopsmith Forums, "Cracks in wide paneling boards", Excerpt from Oct. 28, 2017, downloaded from URL <https://www.shopsmith.com/ss_forum/viewtopic.php?p=214601>; 2 pages.

Pinterest Fungus Objects: Alaska and Canada; Collection by Deborah Tear Haynes, downloaded from URL <https://www.pinterest.

(56) References Cited

OTHER PUBLICATIONS com/deborahtear/fungi-textile-ketchikan-alaska/>; 1 page.
Stamets, "Growing Gourmet and Medicinal Mushrooms", p. 363.
Zadrazil et al., "Influence of CO2 Concentration on the Mycelium Growth of Three Pleurotus Species", European J. Appl. Microbiol., vol. 1, pp. 327-335 (1975).
International Search Report for PCT/US2018/025235, dated Aug. 23, 2018.
International Preliminary Report on Patentability for PCT/US2018/025235, dated Jun. 3, 2020.
Appels et al., "Hydrophobia gene deletion and environmental growth conditions impact mechanical properties of mycelium by affecting the density of the material", Scientific Reports 8:4703 DOI:10.1038/s41598-018-23171-2, Mar. 16, 2018.
Agnese et al., "Investigating the Influence of Various Plasticizers on the Properties of Isolated Films of Polyvinyl Acetat". The 37th Annual meeting and Exposition of the Controlled Release Society, Jul. 2010, Portland, OR U.S.A.
Amsellem et al., "Long-term preservation of viable mycelia of two mycoherbicidal organisms". Crop Protection (1999) 18: 643-649.
Angelini et al., "Effect of antimicrobial activity of Melaleuca alternifolia essential oil on antagonistic potential of Pleurotus species against Trichoderma harzianum in dual culture." World J Microbiol Biotech. (2008) 24(2): 197-202.
Antón et al., "PimM, a PAS Domain Positive Regulator of Pimaricin Biosynthesis in Streptomyces natalensis." Microbiol. (2007) 153: 3174-3183.
Arshad et al., "Tissue engineering approaches to develop cultured meat from cells: a mini review." Cogent Food & Agriculture (2017) 3(1): 1320814 in 11 pages.
Ashiuchi et al., "Isolation of Bacillus subtilis (chungkookjang), a poly-gamma-glutamate producer with high genetic competence". Appl Microbiol Biotechnol. (2011) 57: 764-769.
Bajaj et al., "Poly (glutamic acid)—An emerging biopolymer of commercial interest". Bioresource Tech. (2011) 102(10): 5551-5561.
Baysal et al., "Cultivation of oyster mushroom on waste paper with some added supplementary materials". Biosource Technology (2003) 89: 95-97.
Begum et al., "Bioconversion and saccharification of some lignocellulosic wastes by Aspergillus oryzae ITCC-4857.01 for fermentable sugar production". Elect J Biotech. (2011) (14)5: 3 in 8 pages.
Belardinelli et al., "Actions of Adenosine and Isoproterenol on Isolated Mammalian Ventricular Myocytes." Circulation Res. (1983) 53(3): 287-297.
Belay et al., "Preparation and Characterization of Graphene-agar and Graphene Oxide-agar Composites." JOAPS (2017) 134(33): 45085.
Binder et al., "Phylogenetic and phylogenomic overview of the Polyporales". Mycologia (Nov.-Dec. 2013) 105(6): 1350-1373.
Blanchette et al., "Fungal mycelial mats used as textile by indigenous people of North America", Mycologia (Feb. 20, 2021) pp. 1-7.
Booth et al., "Potential of a dried mycelium formulation of an indigenous strain of Metarhizium anisopliae against subterranean pests of cranberry." Biocontrol Science and Technology (2000) 10: 659-668.
Bormann et al., "Characterization of a Novel, Antifungal, Chitin-binding Protein from Streptomyces Tendae Tu901 that Interferes with Growth Polarity." J Bacter. (1999) 181(24): 7421-7429.
Bowman et al., "The structure and synthesis of the fungal cell wall". Bioassays (2006) 28(8): 799-808.
Bružauskaite et al., "Scaffolds and Cells for Tissue Regernation: Different Scaffold Pore Sizes—Different Cell Effects." Cytotechnology (2016) 68(3): 355-369.
Byrd, "Clean meat's path to your dinner plate", The Good Food Institute, website accessed Nov. 14, 2018, https://www.gfi.org/clean-meats-path-to-commercialization; 11 pages.
Cerimi et al., "Fungi as source for new bio-based materials: a patent review", Fungal Biol Biotechnol. (2019) 6: 17; 10 pgs.

Chai et al., "β-Glucan Synthase Gene Overexpression and β-Glucans Overproduction in Pleurotus ostreatus Using Promoter Swapping". PLoS One (2013) 8(4): e61693 in 7 pages.
Chaudhary et al., "Understanding rice hull ash as fillers in polymers: a review". Silicon Chemistry (2002) 1:281-289.
Chi et al., "Can Co-culturing of Two White-rot Fungi Increase Lignin Degradation and the Production of Lignin-degrading Enzymes?" Inter'l Biodeter Biodegrad. (2007) 59(1): 32-39.
Collins English Dictionary, "Mould", retrieved from http://collinsdictionary.com/dictionary/english/mould, archived on Apr. 8, 2015, 3 pages.
Dias et al., "Synthesis and characterization of chitosan-polyvinyl alcohol-bioactive glass hybrid membranes". Biomatter (2011) 1(1): 114-119.
Elleuche et al., "Carbonic anhydrases in fungi". Microbiology (2010) 156: 23-29.
Elsacker et al., "Growing living and multifunctional mycelium composites for large-scale formwork applications using robotic abrasive wire-cutting", Construction Bldg Mater. (2021) 283: 122732 in 16 pages.
Fleet G.H., "Cell walls", in The Yeasts, by Rose et al. [Eds.] 2nd Edition. vol. 4. London: Academic Press. (1991) pp. 199-277.
Frandsen R.J.N., "A guide to binary vectors and strategies for targeted genome modification in fungi using Agrobacterium tumefaciens-mediated transformation". J Microbiol Methods (2011) 87: 247-262.
Gardening KnowHow, Perlite Soil Info: Learn About Perlite Potting Soil, online at www.gardeningknowhow.com/garden-how-to/soil-fertilizers/perlite-potting-soil.htm downloaded on Dec. 16, 2015., 3 pages.
Glowacki et al., "Bioconjugation of Hydrogen-bonded Organic Semiconductors with Functional Proteins." J Mate Chem. C (2015) 3(25): 6554-6564.
Goodell et al., "Fungal Decay of Wood: Soft Rot-Brown Rot-white Rot". In Development of Commercial Wood Preservatives; Schultz et al. [Ed.] ACS Symposium Series; American Chemical Society, Washington, D.C. (2008), Chapter 2, pp. 9-31.
Google Report, Complete colonization substrate mushroom (2 pages) Jan. 30, 2018., 2 pages.
Google Dictionary Definition "Composite", downloaded on Nov. 21, 2018; 1 page.
Gourmet Mushroom, Inc., "What is Mushroom?"—Mushroom Facts Mushroom Information—Educational & Science Projects (2004). Downloaded from www.gmushrooms.com, on Nov. 27, 2017; 5 pages.
Greetham et al., "Pheotypic characterisation of Saccharomyces sensu stricto to Inhibitory Compounds Released During the Deconstruction of Lignocellulosic Material." 3th International Congress on Yeasts, ICY 2012, August 26-30, Madison, USA; 1 page.
Griffin et al., "Regulation of macromolecular synthesis, colony development and specific growth rate of Achlya bisexualis during balanced growth". J General Microbiol. (1974) 80(2): 381-388.
Growers Supply. "Horticultural Coarse Perlite—4 Cubic Fee—Growers Supply". URL: https://growerssupply.com; Growers Supply 2012; www.growerssupply.com/farm/supplies/prod1:gs_growing_mediums:pg111049.html; downloaded Dec. 14, 2020 in 3 pages.
Heinzkill et al., "Characterization of laccases and peroxidases from wood-rotting fungi (family Coprinaceae)." Appl Environ Microbiol. (1998) 64: 1601-1606.
Home Depot "Miracle Gro® Perlite Mix", retrieved from the internet: http://homedepot.eom/p/Miracle-Gro-8-pt-Perlite-Mix-74278430/204502291; 2 pages.
Home Depot "Pennington—Fast Acting Gypsum", retrieved from the internet: http://homedepot.com/p/Miracle-Gro-8-pt-Perlite-Mix-74278430/204502291; 2 pages.
Horton et al., "Regulation of Dikaryon-Expressed Genes by FRT1 in the Basidiomycete Schizophyllum commune". Fungal Genet Biol. (1999) 26(1): 33-47.
Howden et al., "The effects of breathing 5% CO2 on human cardiovascular responses and tolerance to orthostatic stress". Exper. Physiol. (2004) 89(4): 465-471.

(56) References Cited

OTHER PUBLICATIONS

Hüttner et al., "Recent advances in the intellectual property landscape of filamentous fungi", Fungal Biol Biotechnol. (2020) 7:16; 17 pgs.
Hyde et al., "The amazing potential of fungi: 50 ways we can exploit fungi industrially". Fungal Diversity (2019) 97(1): 1-136.
Jones et al., "Leather-like material biofabrication using fungi", Nature Sustainability (2020) https://doi.org/10.1038/s41893-020-00606-1, Sep. 7, 2020.
Kamzolkina et al., "Micromorphological features of Pleurotus pulmonarius (Fr.) Quel, and P. ostreaturs (Jacq.) P. Kumm. Strains in pure and binary culture with yeasts". Tsitologiia (2006) 48(2): 153-160.
Kemppainen et al., "Transformation of the Mycorrhizal Fungus Laccaria Bicolor using Agrobacterium tumefaciens." Bioengin Bugs (2011) 2(1): 38-44.
Kerem et al., "Effect of Mananese on Lignin Degradation by Pleurotus ostreatus during Solid-State Fermentation". Applied and Environmental Microbiology (1993) 59(12): 4115-4120.
Kilaru et al., "Investigating dominant selection markers for Coprinopsis cinerea: a carboxin resistance system and re-evaluation of hygromycin and phleomycin resistance vectors". Curr Genet. (2009) 55: 543-550.
Kim et al., "Current Technologies and Related Issues for Mushroom Transformation." Mycobiology (2015) 43(1): 1-8.
Kotlarewski et al., "Mechanical Properties of Papua New Guinea Balsa Wood." European J Wood Wood Products (2016) 74(1): 83-89.
Kück et al., "New tools for the genetic manipulation of filamentous fungi". Appl Microbiol Biotechnol. (2010) 86: 51-62.
Kües, U., "Life History and Development Processes in the Basidiomycete Coprinus Cinereus." Micro Molecular Biol Rev. (2000) 64(2): 316-353.
Kuhar et al., by Ingredi Potassium Sorbate vs Campden Tablets in Wine Making; Jun. 4, 2018. [online]; Retrieved from the Internet <URL: https://ingredi.com/blog/potassium-sorbate-vs-campden-tables-in-wine-making/>; 2 pages.
Kuo, 2005-2006. Glossary of Mycological Terms. Mushroom Expert. Com., pp. 1-13; downloaded from http://www.mushroomexpert.com/glossary.html (May 8, 2015).
Li et al., "Preparation and Characterization of Homogeneous Hydroxyapatite/Chitosan Composite Scaffolds via In-Situ Hydration". J Biomaterials Nanobiotech. (2010) 1: 42-49.
Luo et al., "Coprinus comatus: a basidiomycete fungus forms novel spiny structures and infects nematode." Mycologia (2004) 96(6): 1218-1225.
McPherson et al., "Dissolvable Antibiotic Beads in Treatment of Periprosthetic Joint Infection and Revision Arthroplasty: The Use of Synthetic Pure Calcium Sulfate (Stimulan®) Impregnated with Vancomycin & Tobramycin." Reconstructive Review (2013) 3(1) 12 pages.
Merriam-Webster, "Chamber" dictionary definition; https://www.merriam-webster.com/dictionary accessed Jul. 10, 2017; in 4 Pages.
Merriam-Webster, "pack" Thesaurus definition; https://www.merriam-webster.com/thesaurus; synonyms accessed Aug. 19, 2019; in 10 Pages.
Michielse et al., "Agrobacterium-mediated Transformation of the Filamentous Fungus Aspergillus Awamori." Nature Protocols (2008) 3(10): 1671-1678.
Mitchell et al., [Eds.] "Solid-State Fermentation Bioreactors." Springer Verlag, Berlin/Heidelberg (2006); TOC in 12 Pages.
Moore D., "Fungal Morphogenesis." Cambridge University Press, Cambridge, UK; (1998) TOC in 8 Pages.
Moore D., "Tolerance of Imprecision in Fungal Morphogenesis." In Proceedings of the 4th Meeting on the Genetics and Cellular Biology of Basidiomycetes (Mar. 1998) pp. 13-19.
Mushroom Growers' Handbook 1, "Oyster Mushroom Cultivation". Part II, Chapter 5, (2005) pp. 75-85.
Mushroom Growers' Handbook 2, "Shiitake Bag Cultivation", Part I Shiitake. Published by Mush World (2005) Chapter 4, pp. 73-90 and pp. 105-109.
Naknean et al., "Factors Affecting Retention and Release of Flavor Compounds in Food Carbohydrates." Inter'l Food Res J. (2010) 17(1): 23-34.
Newaz et al., "Characterization of Balsa Wood Mechanical Properties Required for Continuum Damage Mechanics Analysis." Proceedings of the Institution of Mechanical Engineers, Part L: Journal of Materials: Design and Applications (2016) 230(1): 206-218.
Norvell L., Fungi Biology. Encyclopedia.(2002); 2 pages.
Novoselova et al., "Cocultivation of Pleurotus ostreatus (Jacq.) P. Kumm, with yeasts". Moscow University Biol Sciences Bulletin (2011) 66(3): 102-105.
Nussinovitch "Polymer Macro-and Micro-Gel Beads: Fundamentals and Applications", DOI 10.1007/978-1-4419-6618_2, Springer Science & Business Media LLC (2010) TOC in 8 Pages.
Paz et al., "One Step Contruction of Agrobacterium-Recombination-ready-plasmids (OSCAR): An Efficient and Robust Tool for ATMT Based Gene Deletion Construction in Fungi." Fungal Gen Biol. (2011) 48(7): 677-684.
Peksen et al., "Favourable Culture Conditions for mycelial growth of Hydnum repandum, a medicinal mushroom." African Journal of Traditional, Complementary and Alternative Medicines (2013) 10(6): 431-434.
Peng et al., "Microbial biodegradation of polyaromatic hydrocarbons". FEMS Microbiol Rev. (2008) 32:927-955.
Perez et al., "Myxococcus xanthus induces actinorhodin overproduction and aerial mycelium formation by Streptomyces coelicolor." Microbial Biotech. (2011) 4(2): 175-183.
Philippoussis et al., "Production of Mushrooms Using Agro-Industrial Residues as Substrates", in Biotechnology for Agro-Industrial Residues, Chapter 9, (2009) pp. 163-187.
Poppe J., Mushroom Growers' Handbook 1,2004, Part II. Chapter 5, "Substrate", pp. 80-81.
Pompei et al., "The Use of Olive Milling Waste-Water for the Culture of Mushrooms on Perlite". Acta Horticulturae (1994) 361:179-185.
Rai et al., "Production of Edible Fungi", in Fungal Biotechnology in Agricultural, Food, and Environmental Applications, D.K. Arora [Ed.], Marcel Dekker, Inc., (2003), Chapter 21, pp. 383-404.
Ross, P., "Pure Culture" 1997-Present; URL: <http://billhoss.phpwebhosting.com/ross/index.php?kind>; downloaded Dec. 14, 2016 in 11 pages.
Royse et al., "Influence of substrate wood-chip particle size on shiitake (Lentinula edodes) yield". Bioresource Tehnology (2001) 76(3): 229-233.
Sapak et al., "Effect of endophytic bacteria on growth and suppression of Tganoderma infection in oil palm". Int J Agric Biol. (2008) 10(2): 127-132.
Schaner et al., "Decellularized Vein as a Potential Scaffold for Vascular Tissue Engineering." J Vascular Surg. (2004) 40(1): 146-153.
Schirp et al., "Production and characterization of natural fiber-reinforced thermoplastic composites using wheat straw modified with the fungus Pleurotus ostreatus". J Appl. Polym. Sci. (2006) 102:5191-5201.
Scholtmeijer et al., "Effect of introns and AT-rich sequences on expression of the bacterial hygromycin B resistance gene in the basidiomycete Schizophyllum commune". Appl Environ Microbiol. (2001) 67(1): 481-483.
Schuurman J., "Unique agar Pearls." YouTube video; Feb. 16, 2012, <https://www.youtube.com/watch?v=8GqTTOHETPQ>; 1 page.
Science Daily, May 7, 2007, retrieved from the Internet; http://www.sciencedaily.com/releases/2007/05/07050685628.htm., 3 pages.
Seamon K.B., "Forskolin: Unique Diterpene Activator of Adenylate Cyclase in Membranes and in Intact Cells." PNAS (1981) 78(6): 3363-3367.
Sinotech et al., (2015): retrieved from the Internet http://www.sinotech.com/compressionAndTransferMolding.html., 4 pages.
Slater, M. "Young SoRo Entrepreneur Develops Environmentally Friendly Insulation." The Herald of Randolph. Jun. 21, 2007, pp. 1-2.

(56) References Cited

OTHER PUBLICATIONS

Staib et al., "Differential expression of the NRG1 repressor controls species-specific regulation of chlamydospore development in Candida albicans and Candida dubliniensis." Molecular Microbiol. (2005) 55(2): 637-652.
Stamets P., "Mycelium Running". Ten Speed Press (2005); pp. 18, 56, 58, 59, 85, 149, 157, 160 and 291 only.
Stanev et al., "Open Cell Metallic Porous Materials Obtained Through Space Holders. Part I: Production Methods, A Review". JMSE (2016) 139(5): 21 pages.
Stephens et al., "Bringing Cultured Meat to Market: Technical, Socio-political, and Regulatory Challenges in Cellular Agriculture." Trends in Food Science & Technology (2018) 78:155-166.
Sundari et al., "Freeze-drying vegetative mycelium of Laccaria fraterna and its subsequent regeneration". Biotechnology Techniques (1999) 13:491-495.
Tartar et al., "Differential expression of chitin synthase (CHS) and glucan synthase (FKS) genes correlates with the formation of a modified, thinner cell wall in in vivo-produced Beauveria bassiana cells." Mycopathologia (2005) 160(4): 303-314.
Téllez-Jurado et al., "Expression of a heterologous laccase by Aspergillus niger cultured by solid-state and submerged fermentations." Enzyme Microbial Tech. (2006) 38(5): 665-669.
Téllez-Téllez et al., "Growth and laccase production by Pleurotus ostreatus in submerged and solid-state fermentation." Appl Microbiol Biotechnol. (2008) 81(4): 675-679.
Thomas et al., "Growing Orchids in Perlite". In Perlite Plant Guide, The Schundler Company 1951, pp. 1-6, downloaded from http://www.schundler.com/index.html, archived on May 11, 2015.
TimberPress—"How Do Mushrooms Grow So Quickly.", downloaded from the internet: www.timberpress.com/blog/2017/01/how-do-mushrooms-grow-so-quickly, download Feb. 27, 2018 in 7 Pages.
Ugalde U., "Autoregulatory Signals in Mycelial Fungi in The Mycota: A Comprehensive Treatise on Fungi as Experimental Systems for Basic and Applied Research". K. Esser [Ed.] Springer Publisher, 2nd Edition (2006) Chapter 11; pp. 203-213.
Universal Oil Field, "Sawdust", downloaded from universaloilfield.org on Aug. 23, 2018, 4 pages.
Vara et al., "Cloning and expression of a puromycin N-acetyl transferase gene from Streptomyces alboniger in Streptomyces lividans and *Escherichia coli*". Gene (1985) 33(22): 197-206.
Visser et al., "Pseudoxylaria as stowaway of the fungus-growing termite nest: Interaction asymmetry between Pseudoxylaria, Termitomyces and free-living relatives". Fungal Ecology (2011) 4(5): 322-332.
Volk (2003) "Tom Volk's Fungus of the Month for Oct. 1998". This month's fungus is Pleurotus ostreatus; the Oyster mushroom, pp. 1-4, downloaded from http://botit.botany.wisc.edu/toms_fungi/oct98.html on May 8, 2015.
Wang et al., "Influence of fungal elicitors on biosynthesis of natamycin by Streptomyces natalensis HW-2". Appl Microbiol Biothechnol. (2003) 97: 5527-5534.
Wikipedia, "Water gel (plain)", Wikipedia Contributors downloaded Aug. 21, 2017 in 1 Page.
Wikipedia, "Wood", downloaded on Nov. 26, 2018, 1 page.
Xiao et al., "A Water-soluble Core Material for Manufacturing Hollow Composite Sections." Comp. Structures (2017) 182: 380-390.
Yang et al., "Medicinal Mushroom Ganoderma lucidum as a Potent Elicitor in Production of t-Resveratrol and t-Peceatannol in Peanut Calluses". J Agric Food Chem. (2010) 58(17): 9518-9522.
Zimin et al., "The MaSuRCA genome assembler". Bioinformatics (2013) 29(21): 2669-2677.
Grant, James. J.—"An investigation of the airflow in mushroom growing structures, the development of an improved, three-dimensional solution technique for fluid flow and its evaluation for the modelling of mushroom growing structures", Doctoral Thesis Sep. 2002; 326 pages.

Antinori et al., "Advanced mycelium materials as potential self-growing biomedical scaffolds." Scientific reports (2021) 11(1): 1-14.
Hidayat et al., "Characterization of polylactic acid (PLA)/kenaf composite degradation by immobilized mycelia of Pleurotus ostreatus". Inter Biodeter Biodegrad. (2012) 71: 50-54.
Jiang et al., "Bioresin Infused then Cured Mycelium-based Sandwich-structure Biocomposites: Resin Transfer Molding (RTM) Process, Flexural Properties, and Simulation." J Cleaner Production (2019) 207: 123-135.
Jones et al., Chitin-chitosan Thin Films from Microbiologically Upcycled Agricultural By-products. In 13th International Conference on the Mechanical Behavious of Materials, Melbourne, Australia (Jun. 2019) p. 66; in 7 pages.
Williams, J. "Growth Industry", Financial Times Jan. 12, 2019 (Mogu—Radical by Nature); download from URL <: https://mogu.bio/growth-industry-financial-times-uk-article/> in 1 page.
Wösten et al., "Growing Fungi Structures in Space", ACT Research Category/Space Architecture; Noordwijk, The Netherlands (Oct. 15, 2018) in 17 pages.
Bartnicki-Garcia, "Cell wall chemistry, morphogenesis, and taxonomy of fungi", Annual Review Microbiol. (1968) 22(1): 87-108.
Cha et al., "Biomimetic synthesis of ordered silica structures mediated by block copolypeptides". Nature (2000) 403(6767): 289-292.
Dugdale J. "This new surf company is making boards of mushrooms". Blog post—Jun. 25, 2015.
Halseide P., "Cutting brick the safe way". The Aberdeen Group (1988) Publication #M880354 in 2 pages.
Highland Woodworking, "Making Thin Lumber and Veneer Out of Ordinary Boards", Sales Website (2017) in 3 pages.
Holt et al., "Biobased Composition Boards Made from Cotton Gin and Guayule Wastes: Select Physical and Mechanical Properties", Int J Mater Prod Tech. (2009) 36: 104-114.
Islam et al., "Morphology and mechanics of fungal mycelium", Scientific Reports, (2017) 7(1): 1-12.
Kerem et al., "Chemically defined solid-state fermentation of Pleurotus Ostreatus". Enzyme Microbiol Tech. (1993) 15(9): 785-790.
Kokubo et al., "Ca,P-rich layer formed on high-strength bioactive glass-ceramic A-W". J Biomed Mater Res. (1990) 24(3): 331-343.
Koutsoukos et al., "Precipitation of calcium carbonate in aqueous solutions". J Chem Soc., Faraday Trans. 1, Physical Chemistry in Condensed Phases, (1984) 80(5): 1181-1192.
Lu et al., "Theoretical Analysis of Calcium Phosphate precipitation in simulated Body Fluid". Biomaterials (2005) 26(10): 1097-1108—Pre-Pub. Version by Hong Kong University of Science and Technology, Department of Mechanical Engineering, Kowloon; 34 pages.
Molvinger et al., "Porous chitosan-silica hybrid microspheres as a potential catalyst". Chem Mater. (2004) 16(17): 3367-3372.
Monmaturapoj et al., "Influence of preparation method on hydroxyapatite porous scaffolds". Bull Mater Sci. (2011) 34(7): 1733-1737.
Manoli et al., "Crystallization of calcite on chitin". J Cryst Growth, (1997) 182(1-2): 116-124.
Mushroom Source, "Aspen Wood Shavings for Mushroom Cultivation", Website (2015) in 2 pages.
National Institute of Health (NIH/NIBIB), "Tissue Engineering and Regenerative Medicine", Retrieved Sep. 24, 2018 from https://www.nibib.nih.gov/science-education/science-topics/tissue-engineering-and-regenerative-medicine in 13 pages.
Passauer U. et al., "Pilze in Höhlen" [Cave Mushrooms]. Denisia (2016) 37: 211-224.
Stewart B., "Concrete Fence Posts: Fact Sheet", Texas Agriculture Extension Service, Texas A&M University (1975) Article L-1368 in 4 pages.
Trinci et al., "II. Unrestricted Growth of Fungal Mycelia", The Mycota—Growth, Differenciation and Sexuality by Wessels et al. [Eds], Springer, Berlin, Heidelberg, (1994) Chapter II: 175-193.
Udawatte et al., "Solidification of xonotlite fibers with chitosan by hydrothermal hot pressing". J Mater Sci. Lttrs. (2000) 45(6): 298-301.
University of Sydney, "Competition Between Fungi". Webpage, accessed Jul. 16, 2014—http://bugs.bio.usyd.edu.au/learning/resources/Mycology/Ecology/competition.shtml in 3 pages.

(56) References Cited

OTHER PUBLICATIONS

Varma et al., "Porous calcium phosphate coating over phosphorylated chitosan film by a biomimetic method". Biomaterials (1999) 20(9): 879-884.
Wagner A. "Mycelium Biking—Eco-Design at its Best", Master's Thesis at Lulea University of Technology (2016) in 92 pages.
Woller R. "The Pearl Oyster Mushroom", University of Wisconsin Website (2011) in 2 pages.
Wan-Mohtar et al., "The morphology of Ganoderma lucidum mycelium in a repeated-batch fermentation for exopolysaccharide production", Biotechnology Reports (2016) 11:2-11.
Weaver et al., "The stomatopod dactyl club: a formidable damage-tolerant biological hammer". Science (2012) 336(6086): 1275-1280.
Yamasaki et al., "A hydrothermal hot-pressing method: Apparatus and Application". J Mater Sci Lttrs. (1986) 5(3): 355-356.
Zivanovic et al., "Changes in Mushroom Texture and Cell Wall Composition Affected by Thermal Processing". J Food Service (2004) 69: 44-49.
Abbadi et al., "Immunocytochemical identification and localization of lipase in cells of the mycelium of Penicillium cyclopium variety", Applied Microbial Cell Physiology (1995) 42: 923-930.
Ando et al., "Cosmetic material for skin whitening—contains mushroom mycelium cultured matter and e.g. ginseng extract, chondroitin sodium sulphate and/or hyaluronic acid", WPI/Thomson (Jan. 14, 1992), 1992(8): Accession #1992-062018; Abstract of JP4009316A; in 9 pages.
Attias et al.., "Biofabrication of Nanocellulose-Mycelium Hybrid Materials", Adv Sustainable Syst. (2020) 5(2): 2000196 in 12 pages; Supporting Information in 7 pages.
Borrás et al., "Trametes versicolor pellets production: Low-cost medium and scale-up", Biochem Eng J. (2008) 42(1): 61-66.
Green et al., "Mechanical Properties of Wood", Forest Products Laboratory, 1999. in Wood Handbook—Wood as an engineering material. Gen Tech. Rep. FPL-GTR-113, Chapter 4 in 46 pages.
Holt et al. "Fungal mycelium and cotton plant materials in the manufacture of biodegradable molded packaging material: Evaluation study of select blends of cotton byproducts." J Biobased Mater Bioenergy (2012) 6(4): 431-439.
Jiang et al., "Manufacturing of Natural Composites with a Mycelium Binder and Vacuum-infused Vegetable Oil-based Resins", Poster dated May 2014; 1 page.
Jiang et al., "Vacuum Infusion of Mycelium-Bound Biocomposite Preforms with Natural Resins", CAMX ExpoConference Proceedings, Oct. 13-16, 2014, 13 pages.
Jones et al., "Mycelim Composites: A Review of Engineering Characteristics and Growth Kinetics", J Bionanoscience (2017) 11 (4): 241-257.
Jones et al., "Waste-derived Low-cost Mycelium Composite Construction Materials with Improved Fire Safety", FAM (Fire and Materials) (2018) 42(7): 816-825.
Kuhn et al., [Eds.] Cell Walls and Membranes in Fungi - An Introduction (Abstract) in Biochemistry of Cell Walls and Membranes in Fungi, Chapter 1, Springer Verlag Berlin/Heidelberg 1990, 2 pages.
Pathway-27, "Beta-glucan", 2012/08, retrieved from http://http://www.pathway27.eu/topstory/beta-glucan/on Oct. 7, 2021 in 2 pages.
Vetchinkina et al., "Bioreduction of Gold (III) Ions from Hydrogen Tetrachloaurate . . . " Scientific Practical J Health Life Sciences No. 4, ISSN 22188-2268, (2013) pp. 51-56.
Wösten et al., "How a fungus escapes the water to grow into the air", Current Biology. (1999) 9(2): 85-88.
Zeng Z., "Cosmetic composition for cleaning skin, comprises glossy ganoderma spores and collagens, content of glossy ganoderma spores in composition and content of collagens in composition", WPI/Thomson (Feb. 5, 2006) 7: Accession #2007-057767; Abstract of CN1732887A; in 11 pages.
Ziegler et al., "Evaluation of Physico-mechanical Properties of Mycelium Reinforced Green Biocomposites Made from Cellulosic Fibers", Appl Engin Agricult. (2016) 32(6): 931-938.
Collins English Dictionary, "Cavity", Definition; retrieved on Nov. 8, 2021; 1 page.
Merriam-Webster, "desiccated" (Adj.) Definition; downloaded on Nov. 8, 2021; 1 page.
Wang et al., "Chemical and structural factors influencing enzymatic saccharification of wood from aspen, birch and spruce". Biomass Bioengin. (2018) 109: 125-134.

SOLUTION BASED POST-PROCESSING METHODS FOR MYCOLOGICAL BIOPOLYMER MATERIAL AND MYCOLOGICAL PRODUCT MADE THEREBY

This application claims the benefit of Provisional Patent Application 62/479,521, filed Mar. 31, 2017.

This invention relates to a processed mycological biopolymer material and a method of making the same. More particularly, this invention relates to a processed mycological biopolymer material made entirely of fungal mycelium. Still more particularly, this invention relates to a method of enhancing the material properties of a mycological biopolymer product As described in US Patent Application Publication 2015/0033620, published Feb. 5, 2015, a mycological biopolymer for use in making functional products may be made entirely of mycelium without producing a stipe, cap or spores. As described, the produced mycological biopolymer may be used in structural composite cores, athletic workout mats, apparel such as handbags, shoe soles and the like.

It is an object of this invention to provide a mycological biopolymer of increased elasticity, strength and density as compared to previously known mycological biopolymers.

It is another object of the invention to provide a processed mycological biopolymer material that is a tough pliable material that can be used to replace textiles, leather and leather-like materials, such as, polyurethane, silicone, and poly vinyl acetate coated scrims.

It is another object of the invention to provide a processed mycological biopolymer material that provides a high density foam-like material for use in upholstery, apparel, military gear, athletic gear and footwear.

Briefly, the invention provides a processed mycological biopolymer material characterized in being entirely composed of fungal mycelium free of any stipe, cap or spores and in having a Young's Modulus of elasticity of 2000-8000 psi and a density of from 15 pcf to 50 pcf.

In addition, the invention provides a method of making an improved processed mycological biopolymer material that resides in treating a known mycological biopolymer material ("tissue") with one or more solutions that function to enhance the inherent material properties of the material. In this instance, the treatment fixes the tissue, making the tissue more durable to repeated stress, resistant to microbial decay, and resistant to shear stress (tearing). This treatment retains the properties of the extracted mycelium (wet) over tissue that has been actively dried which has been shown to embrittle the material.

In one embodiment, the method comprises the steps of obtaining a panel of a mycological biopolymer material ("tissue") as a precursor material and treating the panel with an organic solvent solution for a period of time, e.g. of from 5 seconds up to 6 months, sufficient to permit permeability into the tissue which is inherently hydrophobic. This latter step slowly desiccates the precursor tissue replacing water with the solvent and any inorganics in the solvent solution.

This is rinsing away of soluble extra cellular matrix components (carbohydrates, proteins), and could denature proteins in the tissue. Further, this method could deacetylate the structural chitin matrix, which would mediate crosslinking between polymers. As is known, chitin is a primary component of cell walls in fungi and is composed of a long-chain polymer of N-acetylglucosamine, a derivative of glucose.

A byproduct of this method is the bleaching of the mycelium and elimination of odor.

After treating the precursor tissue with the organic solvent solution, for example a bath of 100% alcohol, the tissue is removed from the bath and immediately pressed to a minor fractional thickness of the original thickness and thereafter dried to a moisture content between 15-30% by dry mass.

The precursor tissue of mycological biopolymer material (as well as the processed tissue) is characterized in being entirely composed of fungal mycelium free of any stipe, cap or spores. For example, the material may be made as described in US Patent Application Publication 2015/0033620 or as described in U.S. Provisional Patent Applications 62/707,704, filed Nov. 14, 2017, the disclosures of which are incorporated herein. For example, the precursor tissue may be grown as described and then removed as a one-piece panel to be post-processed or the precursor tissue may be left in place on the substrate from which the tissue is grown and post-processed.

A precursor tissue of mycological biopolymer material made as described in US Patent Application Publication 2015/0033620 that has dimensions of 18 inches by 11 inches and a thickness of 2.5 inches typically has a density of 0.8 pcf to 3.0 pcf and a Young's Modulus of elasticity of 95 psi. After treatment, the thickness of this highly lofted tissue is reduced, for example, by 20 times to 0.125 inch and the density increased proportionately. In addition, the porosity of the tissue is an average of 3.4 micrometers with a range of from 0.9 to 25 micrometers.

The post-processed mycological biopolymer material is distinguished from one that is not processed in being denser, and in having a native moisture content greater that 15%, while the native precursor tissue is less than 12%.

In a second embodiment, the t precursor issue of mycological biopolymer material is treated with a solution of an organic solvent combined with a salt, such as calcium chloride, for up to six months. The use of salt imparts antimicrobial properties and can ionically bond to functional groups.

In a third embodiment, the precursor tissue of mycological biopolymer material is treated with a solution of an organic solvent combined with a phenol and/or polyphenol substance for up to six months' time.

In a fourth embodiment, the precursor tissue of mycological biopolymer material is treated with a solution of an organic solvent combined with a phenol and/or polyphenol substance as well as with a solution of an organic solvent combined with a salt for up to six months' time.

Treating the mycological biopolymer with one or a combination of organic solvent solutions, calcium chloride solutions, and phenol/polyphenol solutions greatly enhances the material's inherent strength characteristics. These treatments increase the density, ultimate tensile strength, and strength to weight ratio of the precursor mycological biopolymer material. These treatments also impact the material's elastic modulus, resulting in increased elasticity, reduction in stiffness as compared to the weight and tensile strength of the mycelium. With the application of such post-processing treatments, the ability to produce a processed tissue of mycological biopolymer material with a wider range of densities (15-50 pcf) is readily achievable. The result of these enhanced material properties (increased density, strength, and elasticity) is the ability for the processed mycological biopolymer material to be competitive in industries and applications where high density foams, leather, and durable plastic textiles are currently used.

There is a variety of literature and research on the treatment of mycelial tissue with calcium chloride solutions, alcohols, and tannins. The treatment of mycelial tissue post-growth with calcium chloride solutions is common, and has been successfully used for a variety of purposes such as increasing the material strength of the commercially valuable *Agaricus bisporus*. See, Zivanovic, S., and R. Buescher. "Changes in Mushroom Texture and Cell Wall Composition Affected by Thermal Processing." *Journal of Food Science* 69 (2004): 44-49; as well as in the packaging and preserving of edible mushrooms. See U.S. Pat. Nos. 6,500,476 and 5,919,507.

Unlike previous applications of calcium chloride solutions to mycelium tissue post growth, the treatment processes described herein are intended for use on mycological biopolymer materials and not for the purpose of producing, altering or preserving a food item or medicinal substance.

Alcohols, polyphenols, and calcium chloride are used on mycelium for extracting, synthesizing, and the like, a variety of substances. See U.S. Pat. Nos. 6,726,911; 3,268,606 and 6,482,942.

The use of alcohols, polyphenols, and calcium in the post-processing methods applied to mycological biopolymer in accordance with the invention differ from the prior art as there is no the extraction or synthesizing of molecular substances intended for medicinal, pharmaceutical, cosmetic, or other such applications These and other objects and advantages of the invention will become more apparent from the following, detailed description taken in conjunction with the accompanying drawings wherein:

FIG. 1 schematically illustrates a tissue of mycological biopolymer material submerged in a salt/solvent solution in accordance with the invention;

FIG. 2 schematically illustrates a tissue of mycological biopolymer material submerged in a tannic acid/water solution in accordance with the invention;

Figure 1:
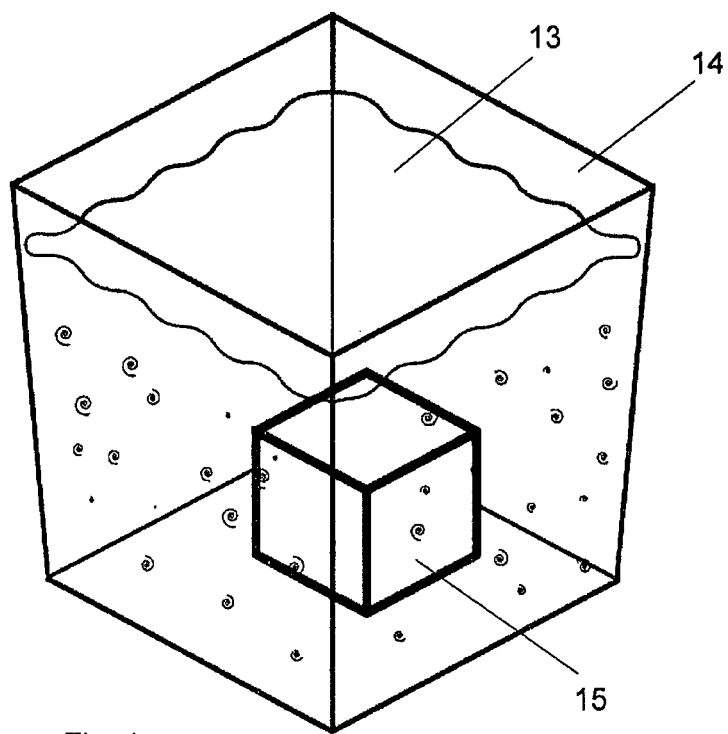

In the embodiment employing an organic solvent solution, the following steps are performed:
1. A panel of wet live tissue or dried tissue, i.e. a precursor tissue, with or without the growing substrate can be used.
2. The tissue can be treated with lipids and/or moisturizing/hydrating agent once or repeatedly, or left untreated at any point throughout this process.
3. The tissue can be sectioned or left intact to allow for a variety of manufacturing sizes.
4. The tissue can be treated (via submersion, vacuum infusion, and/or injection) once or repeatedly. For each treatment, for every 1 g of panel, 5 to 50 mL of organic solvent solution is applied for 5 seconds to 6 months. In this respect, the tissue could also be treated while still growing from a substrate and, as such, would be tethered to the substrate.
   Treatment of the tissue with an organic solvent solution is for a period of time sufficient to permit permeability into the tissue while desiccating the tissue replacing native water with the solvent solution. Increasing time permits more homogenous infiltration of the solution which, in turn, bolsters the chemical treatments.
5. The tissue is thereafter compressed to a minor fraction (i.e. less than ½) of the original thickness, for example to about 1/20 of the original thickness, using a manual press, hydraulic press or rollers. If treated to this point while still tethered to the substrate, the tissue is removed from the substrate for pressing. Pressing can be a hot (140° F.) or cold process. This is a means of mechanically expelling any of the residual fluid and setting the thickness, since the mycelium can plump during treatment. It is important to set the thickness immediately following the treatment in the organic solution to reduce rebound and shrinkage (e.g., fixation)
6. After compression, the tissue can be dried using a convection oven, can be freeze dried, air dried, or conductively dried
7. The tissue can be treated with a plasticizer which could include glycerine, sorbitol, or another humectant in order to assist in retaining the final desired moisture content.
8. The tissue can be stretched, staked, and/or tumbled once or repeatedly or left untreated
9. The tissue can be treated with a pigment or left untreated
10. The tissue is dried using a convection oven, is freeze dried, air dried, or conductively dried A specific example of the method employing a mycological biopolymer made in accordance with a method described in US 2015/0033620 and an organic solvent solution is as follows:

EXAMPLE 1

1. An 18-inch by 11-inch by 2.5-inch panel of a mycological biopolymer ("precursor tissue") is grown and extracted from a substrate composed of 15% crude protein, 33% non-fiber carbohydrates, 28% lignin and 14% crude fat. The remaining 2% includes mineral content, and the 8% is native moisture content.
2. The wet live tissue is cut into 5-inch by 5-inch by 2.5-inch sections.
3. Each tissue section is placed in a container and submerged in an organic solvent, such as a 1500 mL bath of 100% alcohol such as isopropyl, ethanol, methanol, and the like. Each section is left in this solution for 7 days. The sections are then removed from the baths and the same process is repeated once for each panel section.
4. The tissue sections are removed from the alcohol baths and immediately pressed between a pair of rollers to 0.125-inches.
5. The tissue sections are left on drying racks in a fume hood or well ventilated area to air dry.

In the embodiment employing an organic solvent and salt solution, the following steps are performed:
1. A panel of wet live tissue or dried tissue, i.e. a precursor tissue, with or without the substrate can be used.
2. The tissue can be treated with lipids and/or moisturizing/hydrating agent once or repeatedly, or left untreated at any point throughout this process.
3. The tissue can be sectioned or left intact to allow for a variety of manufacturing sizes.
4. The tissue can be treated (via submersion, vacuum infusion, and/or injection) once or repeatedly with organic solvent solutions for 5 seconds to 6 months prior to and/or after process step 5, or left untreated. 5-50 mL of solution per 1 g of panel should be used for each treatment.
5. The tissue is treated (via submersion, vacuum infusion, injection, etc.) once or repeatedly with 20 to 300 g/L salt and organic solvent solutions for 5 seconds to 6 months. 5-50 mL of solution per 1 g of panel should be used for each treatment.
6. The tissue, after removal from the substrate if still tethered to the substrate, is compressed using a manual press, hydraulic press or rollers. Pressing can be a hot or cold process. This is a means of mechanically expelling any of the residual fluid and setting the thickness, since the mycelium can plump during treatment. It is important to set the thickness immediately following the treatment to reduce rebound and shrinkage (e.g., fixation)
7. The tissue can be dried using a convection oven, can be freeze dried, air dried, or conductively dried
8. The tissue can be treated with a plasticizer which could include glycerine, sorbitol, or another humectant in order to assist in retaining the final desired moisture content.
9. The tissue can be stretched, staked, and/or tumbled once or repeatedly or left untreated
10. The tissue can be treated with a pigment or left untreated. Should the tissue be dyed, steps 10 and 8 would be swapped.
11. The tissue is dried using a convection oven, is freeze dried, air dried, or conductively dried A specific example of the method employing a panel of mycological biopolymer made in accordance with a method described in US 2015/0033620 and an organic solvent and salt solution 13 in a container 14 as shown in FIG. 1 is as follows:

EXAMPLE 2

1. An 18-inch by 11-inch by 2.5-inch panel of precursor mycological biopolymer is grown and extracted from the substrate composed of 15% crude protein, 33% non-fiber carbohydrates, 28% lignin and 14% crude fat. The remaining 2% includes mineral content, and the 8% is native moisture content.
2. The wet live tissue is cut into 5-inch by 5-inch by 2.5-inch sections.
3. An organic solvent and salt solution 13 of 150 g/L CaCl2 in 100% alcohol (isopropyl, ethanol, methanol, and the like) is prepared and placed in the container 14 (FIG. 1) and each section 15 is submerged in 1500 mL bath of this solution. The container 14 is then sealed and each section 15 is left in this solution for 7 days. The sections 15 are then removed from the baths and the same process is repeated twice for each panel section for a total of 3 consecutive solution baths over 21 days. Alternatively, the solution could be agitated to accelerate the process time. These agitation methods include stirring, wave motions, tumbling in a drum, and the like. Mild heat could be applied, not to exceed 40° C.
4. Sections 15 are removed from the CaCl2 and alcohol solution and pressed to 0.5 inches using two pairs of spaced apart rollers 11 as in FIG. 3. The rollers 11 may be operated manually in the manner of a wringer.
5. A solution of 100% alcohol (isopropyl, ethanol, methanol, etc.) (not shown) is prepared and each tissue section 15 is submerged in 1500 mL of this solution. Each tissue section 15 is left in this solution for 3 days.
6. The sections 15 are removed from the alcohol baths and immediately pressed, for example, using the rollers 11 of FIG. 3 adjusted to reduce the thickness of the sections to 0.125 inches.
7. The sections 15 are left on drying racks (not shown) in a fume hood or well ventilated area to air dry.

Figure 5:
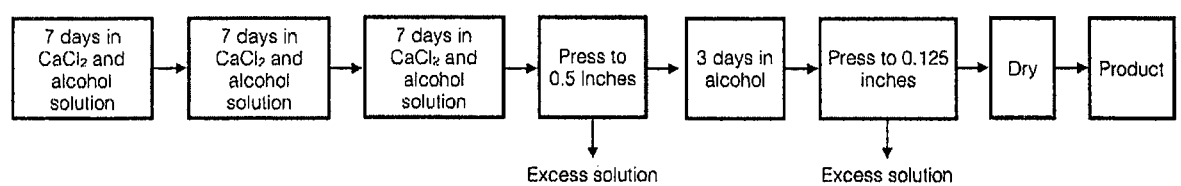
FIG. 5 illustrates a flow diagram of a process in accordance with the invention.

FIG. 5 illustrates a flow diagram of the entire treatment process of Example 2 for organic solvent and salt solutions.

In the embodiment employing an organic solvent and a phenol and/or polyphenol substance solution, the following steps are performed:
1. A panel of wet live tissue or dried tissue, i.e. a precursor tissue, can be used.
2. The tissue can be treated with lipids and/or moisturizing/hydrating agent once or repeatedly, or left untreated at any point throughout this process.
3. The tissue can be sectioned or left intact to allow for a variety of manufacturing sizes.
4. The tissue with/without substrate can be treated (via submersion, vacuum infusion, injection, and the like) once or repeatedly with organic solvent solutions for 5 seconds to 6 months prior to and/or after process step 5, or left untreated. 5-50 mL of solution per 1 g of panel should be used for each treatment.
5. The tissue is treated (via submersion, vacuum infusion, injection, etc.) once or repeatedly with organic solvent and phenol and/or polyphenol solutions for 5 seconds to 6 months. 5-50 mL of solution per 1 g of panel should be used for each treatment.
6. The tissue (without substrate) is compressed using a manual press, hydraulic press or rollers. Pressing can be a hot (temperature of 140° F.) or cold process. This is a means of mechanically expelling any of the residual fluid and setting the thickness, since the mycelium can plump during treatment. It is important to set the thickness immediately following the treatment to reduce rebound and shrinkage (e.g., fixation).
7. The tissue can be dried using a convection oven, can be freeze dried, air dried, or conductively dried.
8. The tissue can be treated with a plasticizer which could include glycerine, sorbitol, or another humectant in order to assist in retaining the final desired moisture content.
9. The tissue can be stretched, staked, and/or tumbled once or repeatedly or is left untreated.
10. The tissue can be treated with a pigment or left untreated.
11. The tissue is dried using a convection oven, is freeze dried, air dried, or conductively dried.

Figure 2:
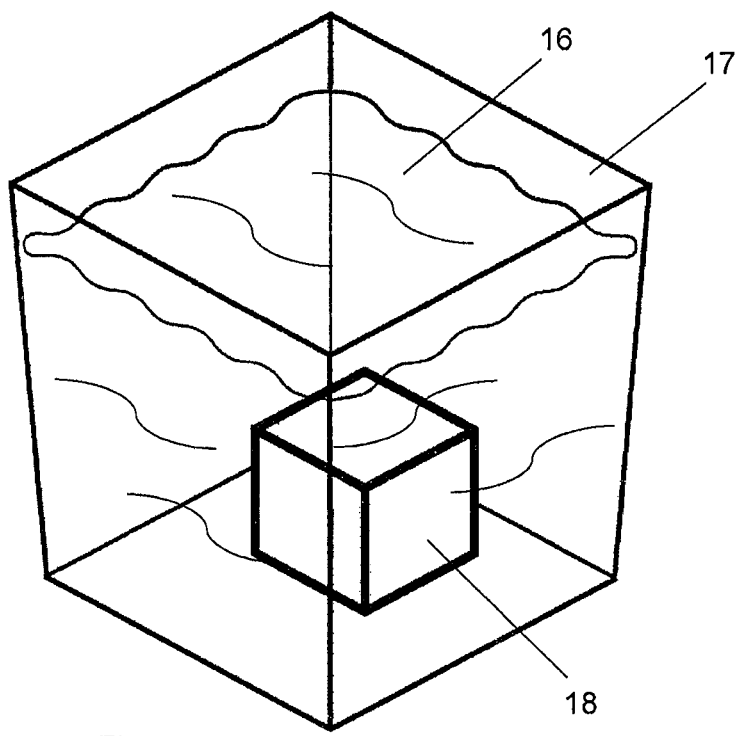

A specific example of the method employing a panel of mycological biopolymer made in accordance with a method described in US 2015/0033620 and an organic solvent and phenol and/or polyphenol solution 16 in a container 17 as shown in FIG. 2 wherein tannic acid, a polyphenolic compound, is used is as follows:

EXAMPLE 3

1. An 18-inch by 11-inch by 2.5-inch panel of mycological biopolymer is grown and extracted from the substrate composed of 15% crude protein, 33% non-fiber carbohydrates, 28% lignin and 14% crude fat. The remaining 2% includes mineral content, and the 8% is native moisture content.

Figure 3:
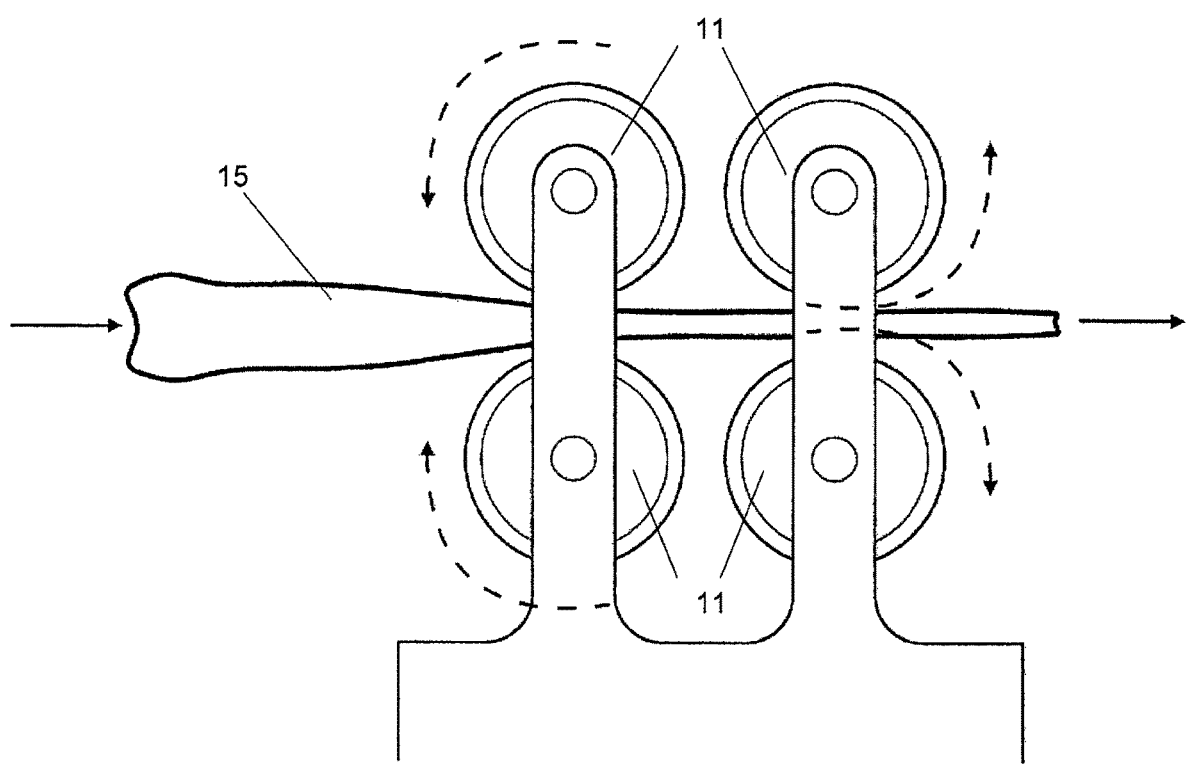
FIG. 3 illustrates a processed tissue being pressed in accordance with the invention.

2. The wet live tissue is cut to 5-inch by 5-inch by 2.5-inch sections 18.
3. The tissue is compressed to 0.125-inches via a hydraulic press.
4. A solution of 5% acetic acid, such as vinegar, is prepared and each tissue section 18 is submerged in 10,000 mL of this solution. Each tissue section 18 is left in this solution for 24 hrs. to bring the pH of said tissue section to a neutral to acidic pH of 5 to 7 to support dying and crosslinking;
5. The sections are then removed from the acid baths, rinsed in 10,000 mL of water for 1 minute, and manually pressed via wringing of the tissue.
6. A solution 16 of 10 g/L Tannic acid powder and water is prepared and each tissue section 16 is submerged in 10,000 mL of this solution 16. Each section 18 is left in this solution for 7 days. (See FIG. 2)
7. The sections 18 are then removed from the tannic acid baths, rinsed in 10,000 mL of water for 1 minute, and manually pressed via wringing of the tissue.
8. A solution of 20 g/L Tannic acid powder and water is prepared and each tissue section 18 is submerged in 10,000 mL of this solution. Each section 18 is left in this solution for 14 days.
9. The sections 18 are then removed from the tannic acid baths, rinsed in 10,000 mL of water for 1 minute, and manually pressed via wringing of the tissue, e.g. as indicated in FIG. 3.
10. A solution of 20 (g/L) vegetable glycerin and water is prepared and each tissue section 18 is coated in 100 mL of this solution.
11. The tissue sections 18 are mechanically agitated via stretching and/or tumbling of material until the sections 18 are between 20-30% moisture
12. The tissue sections 18 are each coated in 50 mL of 20 g/L vegetable glycerin and water solution and mechanically agitated until the sections are between 20-30% moisture. This process is repeated until the sections 18 reach a desirable flexibility determined through bend radius, i.e. the material's ability to wrap around a 1" outer diameter rigid tube forming a 180° bend about the tube without cracking.

Figure 4:
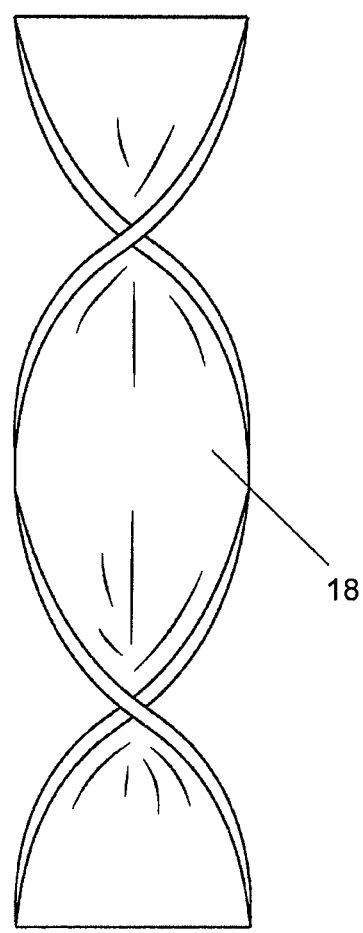
FIG. 4 illustrates a processed mycological biopolymer material made in accordance with the invention being twisted.

FIG. 4 illustrates a coated tissue section 18 with dimensions of 5 inches by 5 inches by 0.125 inches being twisted longitudinally over an angle of 360°.

13. The tissue sections 18 are tumbled and air dried. The sections 18 can be draped or pressed with a match mold over a buck to provide a geometry during the drying process.

In the embodiment employing a solution of an organic solvent combined with a phenol and/or polyphenol substance as well as with a solution of an organic solvent combined with a salt, such as calcium chloride, the following steps are performed:

1. A panel of wet live tissue or dried tissue, i.e. a precursor tissue, can be used
2. The tissue can be treated with lipids and/or moisturizing/hydrating agent once or repeatedly, or left untreated at any point throughout this process
3. The tissue can be sectioned or left intact to allow for a variety of manufacturing sizes.
4. The tissue with/without substrate can be treated (via submersion, vacuum infusion, injection, etc.) once or repeatedly with organic solvent solutions for 5 seconds to 6 months prior to and/or after process step 5 and 6, or left untreated. 5-50 mL of solution per 1 g of panel should be used for each treatment.
5. The tissue with/without substrate is treated (via submersion, vacuum infusion, injection, etc.) once or repeatedly with organic solvent and phenol and/or polyphenol solutions for 5 seconds to 6 months prior to and/or after process step 6. 5-50 mL of solution per 1 g of panel should be used for each treatment.
6. The tissue with/without substrate is treated (via submersion, vacuum infusion, injection, etc.) once or repeatedly with 20 to 300 g/L salt and organic solvent solutions for 5 seconds to 6 months. 5-50 mL of solution per 1 g of panel should be used for each treatment.
7. The tissue (without substrate) is compressed using a manual press, hydraulic press or rollers. Pressing can be a hot or cold process.
8. The tissue can be dried using a convection oven, can be freeze dried, air dried, or conductively dried
9. The tissue can be treated with a plasticizer which could include glycerine, sorbitol, or another humectant in order to assist in retaining the final desired moisture content.
10. The tissue can be stretched, staked, and/or tumbled once or repeatedly or is left untreated
11. The tissue can be treated with a pigment, or left untreated
12. The tissue is dried using a convection oven, is freeze dried, air dried, or conductively dried A specific example of the method employing a panel of mycological biopolymer made in accordance with a method described in US 2015/0033620 and an organic solvent and calcium chloride solution and an organic solvent and phenol and/or polyphenol solution is as follows:

EXAMPLE 4

1. An 18-inch by 11-inch by 2.5-inch panel of mycological biopolymer is grown and extracted from the substrate composed of 15% crude protein, 33% non-fiber carbohydrates, 28% lignin and 14% crude fat. The remaining 2% includes mineral content, and the 8% is native moisture content.
2. The wet live tissue is cut to 18-inch by 5-inch by 2.5 inch sections.
3. The tissue sections are compressed to a thickness of 0.5 inches via hydraulic press
4. A solution of 10 g/L Tannic acid powder and water is prepared and each section is submerged in 5,500 mL of this solution. Each section is left in this solution for 7 days (FIG. 2).
5. A solution of 150 g/L CaCl2 in 100% alcohol (isopropyl, ethanol, methanol, and the like) is prepared and each tissue section is submerged in 5,500 mL of this solution. Each section is left in this solution for 7 days. The sections are then removed from the baths and the same process is repeated once for each panel section for a total of 2 consecutive solution baths over 14 days. (FIG. 1).
6. Tissue sections are removed from the CaCl2 and alcohol solution and pressed to 0.5-inches using a roller. (FIG. 3).
7. A solution of 100% alcohol (isopropyl, ethanol, methanol, etc.) is prepared and each pressed tissue section is submerged in 5,500 mL of this solution. Each section is left in this solution for 1 day.
8. The tissue sections are removed from the alcohol baths and immediately pressed using a pair of rollers to 0.125-inches (FIG. 3).

9. The tissue sections are left on drying racks in a fume hood or well ventilated area to air dry.
10. A solution of 20 (g/L) vegetable glycerin and water is prepared and each tissue section is coated in 100 mL of this solution
11. The tissue sections are mechanically agitated via stretching and/or tumbling of material until the sections have reached a desired softness and flexibility.
12. The tissue sections are tumbled and air dried. Tumbling will loosen the mycelium fibers and assist with achieving the desired hand.

A specific example of the method employing a panel of mycological biopolymer made in accordance with a method described in US 2015/0033620 and a solution of tannins is as follows:

EXAMPLE 5

Steps 1-9 as cited in Example 4
Process in which the precursor tissue is then placed in a solution of tannins, in which the tannins are applied at 5% of the dry tissue mass with a 1:100 ratio with municipal tap water.
The processed tissue is then dried using forced convection at 180 F.
The processed tissue is then dyed with the dye being applied at 5% of the dry tissue mass with a 1:100 ratio with municipal tap water.
The processed tissue is then rinsed with an acetic acid solution at a pH of 3 to fix the dye.
The processed tissue is then rinsed with municipal tap water to remove any unfixed dye.
The processed tissue is then dried using forced convection at 180 F.
The processed tissue is embossed to provide a surface pattern.
The processed tissue is spray coated with a film of wax to prevent water penetration.

The solution of tannins (i.e. an organic solvent solution) may be composed of any of various soluble astringent complex phenolic substances of plant origin used especially in tanning leather and dyeing textiles.

The above described post-processing treatments of a known mycological biopolymer material as a precursor tissue serve to enhance the inherent material properties of the material.

In this instance, the treatment fixes the precursor tissue, making the tissue more durable to repeat stress, resistant to microbial decay, and resistance shear stress (tearing). This retains the properties of the extracted mycelium (wet) over tissue that has been actively dried which has been shown to embrittle the material, specifically retaining elasticity and toughness.

The treatment of the tissue with solvent will enable penetration, rinse extracellular materials away, denature proteins, and deacetylate. The latter two post treatments open sites for crosslinking and fixation.

The treatment of the tissue with phenol provides crosslinking agents, and specifically provides covalent bonds between the primary amine of chitin and the amines and hydroxyl of amino acid residues.

The salt is a humectant and antimicrobial agent. Coupled with methanol, calcium chloride deacetylates chitin which mediates bond formation. In water, the salt can form ionic bonds with the same functional groups.

The pre-processed precursor mycological biopolymer material may be made as described in US 2015/0033620 or may be obtained from any suitable source so long as the material is made of undifferentiated fungal mycelium, specifically a chitin-polymer where extracellular matrix has been rinsed away.

Further, the pre-processed precursor mycological biopolymer material provided for post-processing treatment may have other materials incorporated therein depending upon the ultimate use of the post-processed material, for example, the pre-processed material may have heat insulating particles or elements incorporated therein where the ultimate use of the post-processed material is for heat insulation purposes. There could be embedded materials, such as particles that provide a thermal conductivity benefit, or a structural member, such as a scrim.

The invention thus provides a processed mycological biopolymer material of increased elasticity, strength and density as compared to previously known mycological biopolymers.

The invention also provides a mycological biopolymer that is a tough pliable material that can be used to replace, textiles, leather and leather-like materials, such as, polyurethane, silicone, and poly vinyl acetate coated scrims and that provides a high density foam like material for use in upholstery, apparel, military gear, athletic gear and footwear.

What is claimed is:

1. A method comprising the steps of:
obtaining a tissue consisting essentially of fungal mycelium containing native moisture, wherein said fungal mycelium is free of any stripe, cap or spores;
treating said tissue with an organic solvent solution for a period of time sufficient to permit permeability into the tissue while desiccating the tissue to replace said native moisture with said solvent solution;
removing said tissue from said solution;
pressing said tissue to a minor thickness thereof; and
thereafter drying said tissue, thereby providing a processed mycological biopolymer having a density within a range of 15 pcf to 50 pcf.

2. The method of claim 1, wherein said step of treating comprises treating said tissue with said organic solvent solution in an amount of 5 to 50 ml of organic solvent solution to 1 gram of tissue.

3. The method of claim 2, wherein said step of treating comprises treating said tissue with said organic solvent solution for a period of time of from 5 seconds to 6 months.

4. The method of claim 1, wherein said organic solvent solution is a bath of 100% alcohol.

5. The method of claim 4, wherein said step of treating comprises submerging said tissue at least once in said solution.

6. The method of claim 1, wherein said organic solvent solution comprises salt.

7. The method of claim 6, wherein said organic solvent solution comprises salt at a content of 200 to 300 g of salt to one liter of organic solvent.

8. The method of claim 1, wherein said organic solvent comprises at least one of a phenol and a polyphenol.

9. The method of claim 8, further comprising treating said tissue with a solution of organic solvent comprising salt.

10. The method of claim 1, wherein said step of pressing comprises a first pressing step and a second pressing step.

11. The method of claim 1, wherein said step of pressing comprises compressing said tissue using at least one of a manual press, a hydraulic press and rollers.

12. The method of claim 7, wherein said salt is calcium chloride.

13. The method of claim 9, wherein said salt is calcium chloride.

14. The method of claim 8, wherein said organic solvent solution comprises polyphenol including tannic acid.

15. The method of claim 14, further comprising treating said tissue with a second organic solvent solution, said second organic solvent solution comprising salt.

16. The method of claim 15, wherein treating said tissue with the second organic solvent solution is for a period of time sufficient to impart antimicrobial properties thereto.

17. The method of claim 1, wherein the processed mycological biopolymer is further characterized as having a modulus of elasticity within a range of 2000 to 8000 psi.

18. The method of claim 1, wherein the processed mycological biopolymer is further characterized as having a moisture content of greater than 15% by dry mass.

19. The method of claim 1, wherein the processed mycological biopolymer is further characterized as having a moisture content within a range of 15% to 30% by dry mass.

20. The method of claim 4, wherein the processed mycological biopolymer is further characterized as having a porosity within a range of 0.9 micrometers to 25 micrometers.

21. The method of claim 4, further comprising treating the tissue with a plasticizer.

* * * * *

UNITED STATES PATENT AND TRADEMARK OFFICE
CERTIFICATE OF CORRECTION

PATENT NO. : 11,359,074 B2
APPLICATION NO. : 15/940514
DATED : June 14, 2022
INVENTOR(S) : Jessica Hannah Kaplan-Bie It is certified that error appears in the above-identified patent and that said Letters Patent is hereby corrected as shown below:

On the Title Page

Page 2, Column 2 item (56) (U.S. Patent Documents), Line 29, delete "Araldi" and insert
-- McIntyre --.

Page 2, Column 2 item (56) (U.S. Patent Documents), Line 45, delete "Pisek" and insert -- Plsek --.

Page 3, Column 2 item (56) (Other Publications), Line 5, delete "Instuctables," and insert
-- Instructables, --.

Page 4, Column 1 item (56) (Other Publications), Line 15, delete "Acetat"." and insert -- Acetate". --.

Page 4, Column 1 item (56) (Other Publications), Line 62, delete "Regernation:" and insert
-- Regeneration: --.

Page 4, Column 2 item (56) (Other Publications), Line 46, delete ""Pheotypic" and insert
-- "Phenotypic --.

Page 4, Column 2 item (56) (Other Publications), Line 61, delete "eom/" and insert
-- com/ --.

Page 5, Column 1 item (56) (Other Publications), Line 10, delete "ostreaturs" and insert
-- ostreatus --.

Page 5, Column 1 item (56) (Other Publications), Line 16, delete "Mananese" and insert
-- Manganese --.

Page 5, Column 1 item (56) (Other Publications), Line 33, delete "Ingredi" and insert -- Ingredient --.

Signed and Sealed this
Eleventh Day of October, 2022

Katherine Kelly Vidal
*Director of the United States Patent and Trademark Office*

CERTIFICATE OF CORRECTION (continued)
U.S. Pat. No. 11,359,074 B2

Page 5, Column 2 item (56) (Other Publications), Line 18, delete "Contruction" and insert -- Construction --.

Page 5, Column 2 item (56) (Other Publications), Line 46, delete "Tehnology" and insert -- Technology --.

Page 5, Column 2 item (56) (Other Publications), Line 49, delete "Tganoderma" and insert -- ganoderma --.

Page 5, Column 2 item (56) (Other Publications), Line 65, delete "07050685628" and insert -- 070506085628 --.

Page 6, Column 1 item (56) (Other Publications), Line 51, delete "Biothechnol." and insert -- Biotechnol. --.

Page 6, Column 1 item (56) (Other Publications), Line 59, delete "t-Peceatannol" and insert -- t-Piceatannol --.

Page 6, Column 2 item (56) (Other Publications), Line 13, delete "Behavious" and insert -- Behaviour --.

Page 6, Column 2 item (56) (Other Publications), Line 42, delete "Chern" and insert -- Chem --.

Page 6, Column 2 item (56) (Other Publications), Line 66, delete "Differenciation" and insert -- Differentiation --.

Page 7, Column 2 item (56) (Other Publications), Line 9, delete ""Mycelim" and insert -- "Mycelium --.

Page 7, Column 2 item (56) (Other Publications), Line 22, delete "Tetrachloaurate" and insert -- Tetrachloroaurate --.

In the Specification

Column 1, Line 15 (approx.), delete "product" and insert -- product. --.

Column 3, Line 28, delete "applications" and insert -- applications. --.

Column 4, Line 15-16, delete "fixation)" and insert -- fixation). --.

Column 4, Line 19, delete "dried" and insert -- dried. --.

Column 4, Line 25, delete "untreated" and insert -- untreated. --.

Column 4, Line 27, delete "untreated" and insert -- untreated. --.

CERTIFICATE OF CORRECTION (continued)
U.S. Pat. No. 11,359,074 B2

Column 4, Line 29, delete "dried" and insert -- dried. --.

Column 5, Line 18, delete "fixation)" and insert -- fixation). --.

Column 5, Line 20, delete "dried" and insert -- dried. --.

Column 5, Line 26, delete "untreated" and insert -- untreated. --.

Column 5, Line 31, delete "dried" and insert -- dried. --.

Column 7, Line 34, delete "moisture" and insert -- moisture. --.

Column 7, Line 56, delete "used" and insert -- used. --.

Column 7, Line 59, delete "process" and insert -- process. --.

Column 8, Line 17, delete "dried" and insert -- dried. --.

Column 8, Line 23, delete "untreated" and insert -- untreated. --.

Column 8, Line 25, delete "untreated" and insert -- untreated. --.

Column 8, Line 27, delete "dried" and insert -- dried. --.

Column 8, Line 45, delete "press" and insert -- press. --.

Column 9, Line 5, delete "solution" and insert -- solution. --.

In the Claims

Column 11, Line 20, Claim 20, delete "claim 4," and insert -- claim 1, --.

Column 11, Line 24, Claim 21, delete "claim 4," and insert -- claim 1, --.